(12) United States Patent
Mueller

(10) Patent No.: US 11,475,072 B2
(45) Date of Patent: Oct. 18, 2022

(54) DATA EXTRACTION ENGINE FOR STRUCTURED, SEMI-STRUCTURED AND UNSTRUCTURED DATA WITH AUTOMATED LABELING AND CLASSIFICATION OF DATA PATTERNS OR DATA ELEMENTS THEREIN, AND CORRESPONDING METHOD THEREOF

(71) Applicant: SWISS REINSURANCE COMPANY LTD., Zurich (CH)

(72) Inventor: Felix Mueller, Waedenswil (CH)

(73) Assignee: SWISS REINSURANCE COMPANY LTD., Zurich (CH)

( * ) Notice: Subject to any disclaimer, the term of this patent is extended or adjusted under 35 U.S.C. 154(b) by 1183 days.

(21) Appl. No.: 15/387,070

(22) Filed: Dec. 21, 2016

(65) Prior Publication Data

US 2018/0114142 A1    Apr. 26, 2018

Related U.S. Application Data

(63) Continuation of application No. PCT/EP2016/075820, filed on Oct. 26, 2016.

(51) Int. Cl.

| | |
|---|---|
| *G06N 20/00* | (2019.01) |
| *G06F 16/906* | (2019.01) |
| *G06N 20/10* | (2019.01) |
| *G06N 5/04* | (2006.01) |
| *G06V 30/224* | (2022.01) |

(Continued)

(52) U.S. Cl.
CPC ............ *G06F 16/906* (2019.01); *G06F 17/16* (2013.01); *G06K 9/6269* (2013.01); *G06N 5/04* (2013.01); *G06N 20/00* (2019.01); *G06N 20/10* (2019.01); *G06V 30/224* (2022.01)

(58) Field of Classification Search
CPC .......... G06N 20/00; G06F 17/16; G06K 9/18; G06K 9/6269
USPC .......................................................... 706/12
See application file for complete search history.

(56) References Cited

U.S. PATENT DOCUMENTS

| | | | | |
|---|---|---|---|---|
| 2014/0229164 A1* | 8/2014 | Martens | ................. | G06F 40/40 704/9 |
| 2015/0302436 A1* | 10/2015 | Reynolds | ........... | G06Q 30/0201 705/7.32 |

OTHER PUBLICATIONS

Godbole et al ("Document Classification Through Interactive Supervision of Document and Term Labels" 2004) (Year: 2004).*

(Continued)

*Primary Examiner* — Lut Wong
(74) *Attorney, Agent, or Firm* — Oblon, McClelland, Maier & Neustadt, L.L.P.

(57) ABSTRACT

A fully or semi-automated, integrated learning, labeling and classification system and method have closed, self-sustaining pattern recognition, labeling and classification operation, wherein unclassified data sets are selected and converted to an assembly of graphic and text data forming compound data sets that are to be classified. By means of feature vectors, which can be automatically generated, a machine learning classifier is trained for improving the classification operation of the automated system during training as a measure of the classification performance if the automated labeling and classification system is applied to unlabeled and unclassified data sets, and wherein unclassified data sets are classified automatically by applying the machine learning classifier of the system to the compound data set of the unclassified data sets.

18 Claims, 6 Drawing Sheets

(51) Int. Cl.
*G06F 17/16* (2006.01)
*G06K 9/62* (2022.01)

(56) References Cited

OTHER PUBLICATIONS

Chen et al ("Meta-classifiers for Multimodal Document Classification" 2009) (Year: 2009).*
Dagan et al ("Mistake-Driven Learning in Text Categorization" 1997) (Year: 1997).*

* cited by examiner

| | 501 | 503 | 504 | 505 | 506 | 508 | 509 | 510 | 512 | 513 |
|---|---|---|---|---|---|---|---|---|---|---|
| 501 | 46 | 3 | 4 | 0 | 1 | 0 | 0 | 0 | 0 | 0 |
| 503 | 0 | 22 | 10 | 0 | 1 | 0 | 0 | 0 | 0 | 0 |
| 504 | 0 | 0 | 125 | 0 | 0 | 0 | 0 | 0 | 0 | 0 |
| 505 | 0 | 0 | 0 | 27 | 0 | 0 | 0 | 0 | 0 | 0 |
| 506 | 0 | 0 | 0 | 0 | 48 | 0 | 0 | 0 | 0 | 0 |
| 508 | 0 | 0 | 0 | 0 | 0 | 36 | 0 | 0 | 0 | 0 |
| 509 | 0 | 0 | 0 | 0 | 0 | 0 | 2 | 0 | 1 | 0 |
| 510 | 0 | 0 | 0 | 0 | 0 | 0 | 0 | 24 | 0 | 0 |
| 512 | 0 | 0 | 0 | 0 | 0 | 0 | 0 | 0 | 0 | 0 |
| 513 | 0 | 1 | 0 | 0 | 0 | 0 | 0 | 0 | 0 | 0 |
| 514 | 0 | 0 | 0 | 0 | 0 | 0 | 0 | 0 | 0 | 0 |
| 515 | 0 | 0 | 0 | 0 | 0 | 0 | 0 | 0 | 0 | 0 |
| 516 | 0 | 0 | 0 | 0 | 0 | 0 | 0 | 0 | 0 | 0 |
| 518 | 0 | 0 | 0 | 0 | 0 | 0 | 0 | 0 | 0 | 0 |
| 519 | 2 | 0 | 0 | 0 | 0 | 0 | 0 | 0 | 0 | 0 |
| 520 | 0 | 0 | 0 | 0 | 0 | 0 | 0 | 0 | 0 | 0 |
| 521 | 0 | 0 | 0 | 0 | 0 | 0 | 0 | 0 | 0 | 0 |
| 522 | 0 | 0 | 0 | 0 | 0 | 0 | 0 | 0 | 1 | 0 |
| Tatal | 48 | 26 | 139 | 27 | 50 | 36 | 2 | 24 | 2 | 0 |
| Precision | 95.0% | 84.6% | 89.9% | 100.0% | 96.0% | 100.0% | 100.0% | 100.0% | 100.0% | 0.0% |

Overall Accuracy (for present classes only) - Micro precision - Micro recall - 89.7
Total test pages processed for client(s), 815475. 2457

| 514 | 515 | 516 | 518 | 519 | 520 | 521 | 522 | Total | Recall |
|---|---|---|---|---|---|---|---|---|---|
| 2 | 0 | 1 | 0 | 0 | 0 | 0 | 0 | 57 | 80.7% |
| 0 | 2 | 0 | 0 | 0 | 0 | 0 | 0 | 35 | 62.9% |
| 0 | 0 | 0 | 0 | 0 | 0 | 0 | 0 | 125 | 100.0% |
| 0 | 0 | 0 | 0 | 0 | 0 | 0 | 0 | 27 | 100.0% |
| 0 | 0 | 0 | 0 | 0 | 0 | 0 | 0 | 48 | 100.0% |
| 0 | 0 | 0 | 0 | 0 | 0 | 0 | 0 | 36 | 100.0% |
| 0 | 1 | 0 | 0 | 0 | 0 | 0 | 0 | 2 | 100.0% |
| 0 | 0 | 0 | 0 | 0 | 1 | 0 | 0 | 25 | 96.0% |
| 1 | 0 | 0 | 0 | 0 | 0 | 0 | 0 | 1 | 100.0% |
| 88 | 0 | 0 | 0 | 0 | 0 | 0 | 0 | 1 | 0.0% |
| 0 | 25 | 221 | 0 | 0 | 0 | 0 | 0 | 88 | 100.0% |
| 0 | 0 | 0 | 56 | 1566 | 0 | 0 | 0 | 26 | 96.2% |
| 0 | 0 | 0 | 0 | 0 | 0 | 0 | 0 | 221 | 100.0% |
| 0 | 0 | 0 | 0 | 0 | 17 | 0 | 0 | 57 | 98.9% |
| 0 | 0 | 1 | 0 | 0 | 0 | 50 | 50 | 1566 | 99.9% |
| 0 | 0 | 0 | 0 | 0 | 0 | 0 | 28 | 17 | 100.0% |
| | | | | | | | | 50 | 100.0% |
| | | | | | | | | 29 | 96.6% |
| 91 | 28 | 223 | 56 | 1566 | 18 | 50 | 28 | | |
| 96.7% | 89.3% | 89.3% | 100.0% | 100.0% | 94.4% | 100.0% | 100.0% | | |

FIG. 5B

DATA EXTRACTION ENGINE FOR STRUCTURED, SEMI-STRUCTURED AND UNSTRUCTURED DATA WITH AUTOMATED LABELING AND CLASSIFICATION OF DATA PATTERNS OR DATA ELEMENTS THEREIN, AND CORRESPONDING METHOD THEREOF

CROSS REFERENCE TO RELATED APPLICATION

This application is a Continuation of PCT international Application No. PCT/EP2016/075820, filed on Oct. 26, 2016, currently pending, the entire contents of which are incorporated herein by reference.

FIELD OF THE INVENTION

The present invention relates to automated or semi-automated systems for extracting, accessing, manipulating and/or classifying and/or labeling data from structured, semi-structured and unstructured documents. In particular, it relates to the field of automated, autarkic labeling and classifying of large underwriting and claim documents in the field of risk-transfer, with typically inconsistent data sets, and thereby automatically generating training data sets for machine learning classifiers. However, the present invention is also applicable to the field of general automated labeling and classifying of large data sets.

BACKGROUND OF THE INVENTION

The vast majority of projects and/or proprietary data nowadays are based on structured data. However, it is estimated that eighty percent of an organization's data is unstructured, or only semi-structured. A significant portion of such unstructured and semi-structured data is in the form of documents. The industry and/or organizations try applying analytics tools for handling their structured data in efforts of easing access, data processing and data management. However, this does not mean that such unstructured and semi-structured documents no longer exist. They have been, and will continue to be, an important aspect of an organization's data inventory. Further, semi-structured and unstructured documents are often voluminous. Such documents can consist of hundreds or even thousands of individual papers. For example, a risk-transfer underwriting document, a risk-transfer claim document or a purchaser's mortgage document can be stored as a single 500-page or even larger document comprising individual papers, such as, for the latter case, the purchaser's income tax returns, credit reports, appraiser's reports, and so forth, bundled into a single mortgage document. Each purchaser is associated with a different mortgage document. Thus, the size and volume of documents can be very large. Documents may be stored across various storage systems and/or devices and may be accessed by multiple departments and individuals. Documents may include different types of information and may comprise various formats. They may be used in many applications, as e.g. mortgages and lending, healthcare, environmental, and the like; moreover, they are draw their information from multiple sources, like social networks, server logs, and information from banking transactions, web content, GPS trails, financial or stock market data, etc.

More than data accumulation within organizational structures, the recent years have further been characterized by a tremendous growth in natural language text data, including web pages, news articles, scientific literature, emails, enterprise documents and social media data, such as blog articles, forum posts, product reviews, and tweets. This has led to an increasing demand for powerful data processing tools and engines to help individuals manage and analyze vast amounts of structured, semi-structured, and unstructured data as pure text data, effectively and efficiently. Unlike data generated by a computer system, sensors or measuring devices, these text data are often generated by humans for humans without intermediary instance. In particular, such text data that are generated by humans for humans accumulate into an important and valuable data source for exploring human opinions and preferences or for analyzing or triggering other human-driven factors, in addition to many other types of knowledge that people encode in text form. Also, since these text data are written for consumption by humans, humans play a critical role in any prior art text data application system; a text management and analysis system must therefore typically involve the human element in the text analysis loop.

According to the prior art, existing tools and engines supporting text management and analysis can be divided into two categories. The first category includes search engines and search engine toolkits, which are especially suitable for building a search engine application but tend to have limited support for text analysis/mining functions. Examples include Lucene, Terrier, and Indri/Lemur. The second category is text mining or general data mining and machine learning toolkits, which tend to selectively support some text analysis functions but generally do not support a search capability. Nonetheless, combining and seamlessly integrating search engine capabilities with sophisticated text analysis capabilities is necessary for two reasons: While the raw data may be large for any particular problem, as discussed above, it is often a relatively small subset of the relevant data. Search engines are an essential tool for quickly discovering a small subset of relevant text data in a large text collection. On the other hand, however, we need search engines that will help analysts interpret any patterns that are discovered within the data by, allowing them to examine any relevant original text data in order to make sense of any discovered pattern. A possible solution should therefore emphasize a tightly controlled integration of search capabilities (or text access capabilities in general) with text analysis functions, thus facilitating a fully supported function for building a powerful text analysis engine and tool.

Further, in the prior art, there already exist different classifiers, as e.g. MeTA (cf. meta-toolkit.org), Mallet (cf. mallet.cs.umass.edu) or Torch (cf. torch.ch), whereas the latter is, technically speaking, an example for a deep learning system, not a classifier as such, which, however, can be used to build an appropriate classifier. Typically, these classifiers allow for the application of one or more standard classifiers, either alone or in combination, as for example MeTA with Naïve Bayes, SVM, and/or kNN (using BM25 as a ranking structure), Mallet with Naïve Bayes, Max Entropy, Decision Tree, and/or Winnow trainer, or Torch using deep learning approaches (Conv Net for image and text processing). Under the standard classifiers, Naive Bayes Classifier (NBC) is one of the most widely used standard classifiers in the field of the machine-learning systems. Often, NBC is the first classifying structure that tried in the context of a new field. However, one of the inherent weakness of its technical assumption, that features are independent. Bayesian networks bypass this assumption by encoding feature dependence into the structure of the network.

This normally works well in classification applications with substantial dependence among certain sets of features, and such dependence is either known or learnable from a sufficiently large training set. In the latter case, one may use one of the various structure-learning algorithms; however, they are not always operable, because the structure-learning problem is very complex. Undirected graphical models are another option for bypassing this assumption. Like Bayesian networks, they also require domain knowledge or a structure-learning procedure. Domain knowledge can be manually coded into the structure; but this only works if domain knowledge is available and, even then, manual coding is usually very laborious. Alternatively, structure-learning algorithms require extensive training data and present a technically and computationally complex problem; in addition, there is the concern of over-fitting a model due to the use of a limited data set, thereby creating a model that predicts structures that are less likely to work well on data not seen during training. Undirected graphical models typically also operate poorly if either the domain knowledge is wrong or if the instance of the structure-learning problem is either intrinsically difficult or there is insufficient training data.

Prior art systems and engines, able to analyze large data sets in various ways and implementing big data approaches, normally depend heavily on the expertise of the engineer, who has considered the data set and its expected structure. The larger the number of features of a data set, sometimes called fields or attributes of a record, the greater the number of possibilities for analyzing combinations of features and feature values. Accordingly, there is a demand for modalities that facilitate automatically analyzing large data sets quickly and effectively. Examples of uses for the disclosed inventive classification system are, inter alia, the analysis of complex life or non-life insurance or risk-transfer submission documents, means for identifying fraudulent registrations, for identifying the purchasing likelihood of contacts, and identifying feature dependencies to enhance an existing classification application. The disclosed classification technology consistently and significantly outperforms the known prior art systems, such as MeTA, Mallet, or Torch and their implemented classification structures, such as Naïve Bayes, SVM, and/or kNN, Max Entropy, Decision Tree, Winnow trainer, and/or deep learning approaches.

Further, also known in the prior art are automated, so called meta classifier systems. In this context, data mining denotes a process that provides for automatically, or semi-automatically processing and analyzing a large database to find specified patterns and data. Data mining is closely related to knowledge discovery. Known basic techniques in data mining are clustering, association rule discovery, classification and sequential pattern discovery. Known distributed data mining techniques are, inter alia, distributed classifier learning, collective data mining and distributed clustering. The main goal associated with data mining is the arrival at predictive and descriptive assumptions and measured values. Descriptive data mining provides information to help understanding what is comprised inside the data without having any predetermined ideas. Predictive data mining allows the user to submit records with unknown field values. As mentioned above, it is known in the art to apply supervised learning structures for automated classifier systems with the combined use of single classifier structures, as e.g. the aforementioned MeTA system, Mallet system or Torch system. Supervised machine learning tasks involve mapping input data to the appropriate outputs. In a classification learning task, each output is one or more classes to which the input belongs. The goal of classification learning provides for developing a structure that separates the data into the different classes, associated with the aim of classifying new examples in the future. For example, an automated credit card system seeks to ensure that different users who defaulted on their credit card payments are separated from those users who did not default, respectively, based on other known information such as annual income. The goal would be to automatically capture and predict whether a new credit card applicant is likely or not likely to default on his credit card charges and thereby automatically deciding whether to approve or deny this applicant a new card. In a regression learning task, each output is a continuous value that is to be predicted. Many traditional machine learning algorithms generate a single model (e.g., a decision tree or neural network). Ensemble learning methods, instead, generate multiple models. When it is given a new example, the ensemble passes the same to each of its multiple base models, obtains their predictions and then combines these predictions in an appropriate manner (e.g., averaging or voting). It is important to have base models that are competent but also complementary. For example, a conceivable classification problem would specify the goal of separating the points marked by plus signs from points marked by minus signs. Further, if none of three used individual linear classifiers (e.g. A, B, and C) is able to separate the two classes of points, a majority vote over all three linear classifiers, however, may yield a piecewise linear classifier. This classifier is then able to separate the two classes. For example, the plus'es may be correctly classified by A and B, but are misclassified by C. The majority vote over these items correctly classifies these points as plus'es. This happens because A and B are very different from C. If instead the ensemble consisted of three copies of C, all three classifiers would misclassify the plus'es at the top of the figure, and so would a majority vote over these classifiers. Single classifiers are, inter alia, decision trees, rule approaches, logical statements (ILP), Bayesian classifiers, neural networks, discriminant analysis, Support Vector Machines (SVM), k-nearest neighbor classifiers, logistic regression, artificial neural networks, genetic classifiers, etc. Notwithstanding the fact that the combination of single classifiers is known in the prior art, the typical technical approach still involves creating and evaluating a single learning algorithm and then comparing the performance of selected algorithms. It is an empirical observation that a given single classifier may outperform all others for a specific subset of problems. Typically, there is no one single algorithm that achieves the best accuracy in all situations. However, a complex problem can be disassembled into multiple smaller sub-problems that are easier to solve by combining a set of learning classifiers into one system.

Multiple classifier structures, normally implemented by meta classifier systems, integrate a set of classifiers whose individual predictions are combined in some way to classify new examples. The integration should improve predictive accuracy. In the prior art, the task of constructing ensembles of classifiers (cf. T. G. Dietterich, Machine-learning research: Four current directions. AI Magazine, 1997, 18:4, 97-136) is usually broken down into two sub-tasks. First, a diverse set of base-level classifiers is generated. Once the base-level classifiers have been generated, the issue of how to combine their predictions must be resolved. Different approaches are used for generating base-level classifiers. One approach envisions generating classifiers by applying different learning algorithms (with heterogeneous model representations) to a single data set (see, e.g., C. J. Merz, Using correspondence analysis to combine classifiers, Machine Learning, 1999). Another possibility provides for applying a single learning algorithm with different parameter settings to a single data set. Finally, methods like bagging (cf. L. Breiman, Bagging predictors, Machine Learning, 1996) and boosting (cf. Y. Freund & R. E. Schapire, Experiments with a New Boosting Algorithm, Proceedings of the Thirteenth International Conference on Machine Learning, San Mateo, 1996) generate multiple classifiers by applying a single learning algorithm to different versions of a given data set. Two different methods for manipulating the data set are used: random sampling with replacement (also called bootstrap sampling) in bagging and re-weighting of the misclassified training examples in boosting. Further, the state of the art techniques for combining predictions obtained from the multiple base-level classifiers can be clustered in three combining frameworks: voting (used in bagging and boosting), stacked generalization or stacking (cf. D. Wolpert, Stacked Generalization, Neural Networks, 1992) and cascading (cf. J. Gama, Discriminant Trees, Proceedings of the Sixteenth International Conference on Machine Learning, San Mateo, C A, 1999). In voting, each base-level classifier gives a vote for its prediction. The prediction receiving the most votes is the final prediction. In stacking, a learning algorithm is used for learning how to combine the predictions of the base-level classifiers. The induced meta-level classifier is then used to obtain the final prediction from the predictions of the base-level classifiers. Cascading is an iterative process of combining classifiers: at each iteration, the training data set is extended by the predictions obtained from the given previous iteration.

However, often complex problems cannot be properly classified by the appropriate systems, even when using cascades of classifiers. Also, using enhancing techniques, such as word stemming, the additional use of image based classifiers (e.g., surf, phash, conv nets) and/or topic modelling (using LDA to characterize the document or file parts that were properly classified and boost them; vice versa, remove pages from the training set which are confusing.) and/or decision and switching rules based on the recognition accuracy, does in many cases not help to overcome the deficiencies of the classifiers. First and foremost, the crucial aspect concerning the classifiers is correct labeling of the training sets. In the prior art, training sets were for the most part labeled by human experts; this action is performed manually and cannot be automated. An unrelated problem associated with labeling the training set is, furthermore, the manner in which these sets are labeled. If possible labeling structures are not correctly recognized and assessed, it is not possible for the classifiers to be trained properly. In addition, human experts may make mistakes during the process of labeling the training sets. Any wrongly labeled training data will confuse the classifiers that will typically not be able to give appropriate feedback for correcting the labels of the training set. Finally, labeling thousands of training pages can be very time-consuming.

SUMMARY OF THE INVENTION

It is one object of the present invention to provide an automated or at least semi-automated labeling and classification engine and system without the above-discussed drawbacks. The automated or semi-automated engine and system should be able to generate test data without significant human interference. The system shall have the technical capability to apply a particular decision based on which a particular form can be easily and automatically added to the whole training set. On the other hand, the system should be able to automatically refer similar pages to a selected page or form, if it is not clear how a page or data element should be classified. The system should also provide structures for automatically detecting inconsistently or wrongly labeled data, and it should provide appropriate warnings. Instead of having to label thousands of training pages, which are mostly identical and thus not adding much value, the system should be able to detect and flag gaps in the training data so that these gaps can be closed easily. Once all training and testing data have been labeled, the system should also provide automated features for detecting and flagging where inconsistent labels have been assigned for the same forms. Finally, the system should allow for an automated rating, specifically regarding the good or bad quality of an OCR text quality or classification. This allows for preventing that bad data are added to the training set. In summary, it is an object of the present invention to provide a new labeling, classification and meta learning system, wherein the number of cases that is classified correctly may be used to arrive at an estimated accuracy of the operation of the system. The aim is to provide a highly accurate, and thereby automated or semi-automated system, and engine that is easy to implement and achieves a novel level of efficiency when dealing with large and multiple data set.

According to the present invention, these objects are achieved, particularly, with the features of the independent claims. In addition, further advantageous embodiments can be derived from the dependent claims and the related descriptions.

According to the present invention, the above-mentioned objects concerning a fully automated, integrated learning and labeling and classification system with closed, self-sustaining pattern recognition, labeling and classification operation are achieved, particularly, in that, unclassified data sets are selected and converted to a composition of graphic and text data forming compound data sets to be classified, wherein, by means of generated feature vectors of training data sets, a machine learning classifier is trained for generically improving the classification operation of the automated system during the training step as a measure of the classification performance, if the automated labeling and classification system is applied to unlabeled and unclassified data sets, and wherein unclassified data sets are classified by applying the machine learning classifier of the system to the compound data set of the unclassified data sets, in that training data sets, in particular self-training sets, are generated by means of the automated system, wherein, for each data set of selected test data sets, a feature vector is generated by means of a labeling module of the automated learning and labeling and classification system comprising a plurality of labeled features associated with the different selected test data sets, in that the system generates a two-dimensional confusion matrix based on the feature vector or appropriately generated test results of the test data sets, wherein the first dimension comprises pre-processed labeled features of the feature vectors of the test data sets and the second dimension comprises the labels generated by the classifier, which are the classified and verified features of the feature vectors of the test data sets by applying the machine learning classifier to the test data sets, and in that, in case an inconsistently or wrongly classified test data set and/or feature of a test data set is detected, the system generates corresponding additional training data sets based on the confusion matrix, which are added to the training data sets filling in the gaps in the training data sets and improving the measurable performance of the system. In case an inconsistently or wrongly classified test data set and/or feature of a test data set is detected, the system can also assign the inconsistently or wrongly classified test data set and/or feature of the test data set to the training data sets, if comparable training data sets are triggered within the training data sets based on the confusion matrix, and the system creates a new labeling feature of the recognizable feature vector, if no comparable training data sets are triggered within the training data sets. As an embodiment variant, the pre-processed labeled features of the feature vectors of the test data sets comprise manually labeled pre-processed features of the feature vectors of the test data sets as a verified gold standard. In the case that the system is implemented as a semi-automated system, the user is supporting the labeling and classification process by manually reviewing and possibly correcting wrong labels. In a tested environment, the labels to be corrected amount to about 8%, wherein the system is supporting the user in such a way in that the corrections can be made fast and consistently. The machine learning classifier can comprise e.g. at least a scalable Naive Bayes classifier based on a linear number of parameters in the number of features and predictors, respectively. The machine learning classifier can e.g. comprise a non-probabilistic, binary, linear, support vector machines classifier (SVM) and/or a non-parametric k-Nearest Neighbors (k-NN) classifier, and/or an exponential, probabilistic, max entropy classifier, and/or decision tree classifier based on a finite set of values, and/or Balanced Winnow classifier, and/or deep learning classifiers using multiple processing layers composed of multiple linear and non-linear transformations. The machine learning classifier can apply unigrams and bigrams and/or a combination of unigrams and bigrams or n-grams are applied to the machine learning classifier. Distribution scaling can e.g. be applied to the data sets scaling word counts ensuring that pages with small numbers of words are not underrepresented. The probability of words that are quite unique for a certain class can e.g. be boosted as compared to other words that occur relatively frequently in other classes. Pages of a data set can e.g. be ignored by the system if the given page comprises only little or non-relevant text compared to average pages, and the label of the previous page is assigned during inference. The data set can e.g. be triggered for spikes in the data set, wherein the system generically filters out data sets with spikes as representing unlikely scenarios. For example, the defined features can be selectable to be ignored by the machine learning classifier. The selected unclassified data sets can e.g. be converted into a composition of graphic and text data forming a compound data set to be classified, wherein the unclassified data sets can be pre-processed by optical character recognition converting images of typed, handwritten or printed text into machine-encoded text. The selected unclassified data sets can e.g. be converted into a composition of graphic and text data forming a compound data set to be classified, wherein the graphic data are stored as raster graphics images in tagged image file format; and the text data are stored in plain text format or rich text format. One of the advantages of the present system is that fact that it provides a technical solution which allows for full automated or at least semi-automated training, labeling and classification of an appropriate classifier. In the prior art, for the most part, this had to be done manually. For semi-automated systems according to the invention, the manual labeling effort and operator's input can be reduced at least by a factor of 10-20. Another advantage is the fact that, when the test data are generated, most pages have already been properly classified; and only very few pages need to be double checked. Further, the automated system allows for labeling all similar forms of the total training set in one go-through just by labeling one form. If it is not clear how a given page is to be classified, the system allows for comparing similar pages and for ascertaining how said given page were labeled in past. Further, the classifier is able to issue an automated warning feature, if the classifier becomes confused by the input on non-homogeneously labeled data. Instead of having to label thousands of training pages, which are mostly identical and thus do not add much value, the system automatically gives the location where gaps exist in the training data so that the gaps can easily be closed. Once all training and testing data have been labeled, the system flags where non-consistent labels for the same forms have been assigned. If a page is recognized as exhibiting poor data quality, the system allows for measuring the level of quality of the OCR text quality. Finally, it is to be mentioned that most training methods for detecting or classifying objects in non-classified data sets are trained by providing labeled example sets or training frames of such non-classified data. After the classifier is trained, known, i.e. labeled, test data sets can be processed in order to determine a given performance accuracy of the classifier. Such methods may demonstrate good performance, if training and testing is done under similar conditions, such as under same-condition-captured data sets. However, in reality, conditions often change because training and deployment can be under differently captured data conditions or different environmental circumstances, which may vary widely by aspects, such as region-specific, user-specific or other conditions of the object. Often, it cannot be determined ahead of time to what types of conditions the classier will be applied. The inventive system does not suffer from the technical problems associated with the previously discussed uncertainty, since it can be adapted or self-adapted easily and efficiently by means of the classifier complementing the training data sets that have been inconsistently or wrongly assigned or labeled. The present invention allows for a partially or fully automated adaption of the classifier to new data sets, which comprise one data item or a plurality of particular data unknown or not available when the classifier was trained. In the case of a semi-automated system, the present inventive system highly effectively supports the user in efficiently and consistently labeling inconsistently or wrongly classified data. The inventive system is able to provide a generic classifier generating self-training data based on a first plurality of structured, semi-structured and unstructured data associated with a user and/or device and/or another environmental-specific object, and training a graduate-improved classifier based on the self-training data. Additionally, the generic system and classifier may be used to generate validation data based on a second plurality of data sets associated with the user and/or device and/or another environmental-specific object. In an embodiment variant, the classifier can further be substituted, for one or more generic classifiers, if the validation data sets indicate that the trained classifier satisfies a confidence condition relative to the one or more generic classifiers, or the trained classifier does not perform within a technically specified default threshold performance parameter.

In one alternative embodiment, the machine learning classifier comprises at least one population of separate rule sets, where the generic learning operation recombines and reproduces the best of these rule sets, and/or the machine learning classifier comprises a single set of rules in a defined population, where the generic learning operation selects the best classifiers within that set. The system can e.g. comprise a predefined threshold value for a performance-strength-based and/or accuracy-based classification operation performance. This embodiment has, inter alia, the advantage that it allows for applying a new and unified approach to automated classification systems, wherein also meta-classifier systems and combined classifier systems are capable of being integrated and can be implemented in a fully automated fashion by the present system. Further, the system has the advantage that a completely controllable learning operation is provided that can be steered by means of the defined threshold value.

In another embodiment, each feature vector comprises a plurality of invariant features associated with a specific data set or an area of interest relative to a data set. The invariant features of the graphic data of the compound data set of the specific data set comprise scale invariant, rotation invariant and position invariant features. The area of interest comprises a representation of at least a portion of a subject object within the image or graphic data of the compound data set of the specific data set, the representation comprising at least one of an object axis, an object base point, or an object tip point, and wherein the invariant features comprise at least one of a normalized object length, a normalized object width, a normalized distance from an object base point to a center of a portion of the image or graphic data, an object or portion radius, a number of detected distinguishable parts of the portion or the object, a number of detected features pointing in the same direction, a number of features pointing in the opposite direction of a specified feature, or a number of detected features perpendicular to a specified feature. This embodiment has, inter alia, the advantage that it allows for further improving the new and unified approach to automated classification systems, as proposed above. Further, it has the same advantages as the preceding embodiment variants.

In addition to the system as described above and the corresponding method, the present invention also relates to a computer program product that includes computer program code means for controlling one or more processors of the control system in such a way that the control system performs the proposed method; and it relates, in particular, to a computer program product that includes a computer-readable medium that contains the computer program code means for the processors.

BRIEF DESCRIPTION OF THE DRAWINGS

The present invention will be explained in more detail by way of examples and in reference to the drawings in which:

FIGS. 5A and 5B show a block diagram, schematically illustrating an exemplary implementation of the confusion matrix 6, including bad cases or wrongly classified data sets 3. The labels on the vertical axis are the manually assigned labels. The labels on the horizontal axis are the labels assigned by the classifier. For example, it can be discerned that S03 is not very well detected. There is greater confusion between S03 and S04.

DETAILED DESCRIPTION OF THE PREFERRED EMBODIMENTS

Figure 1:
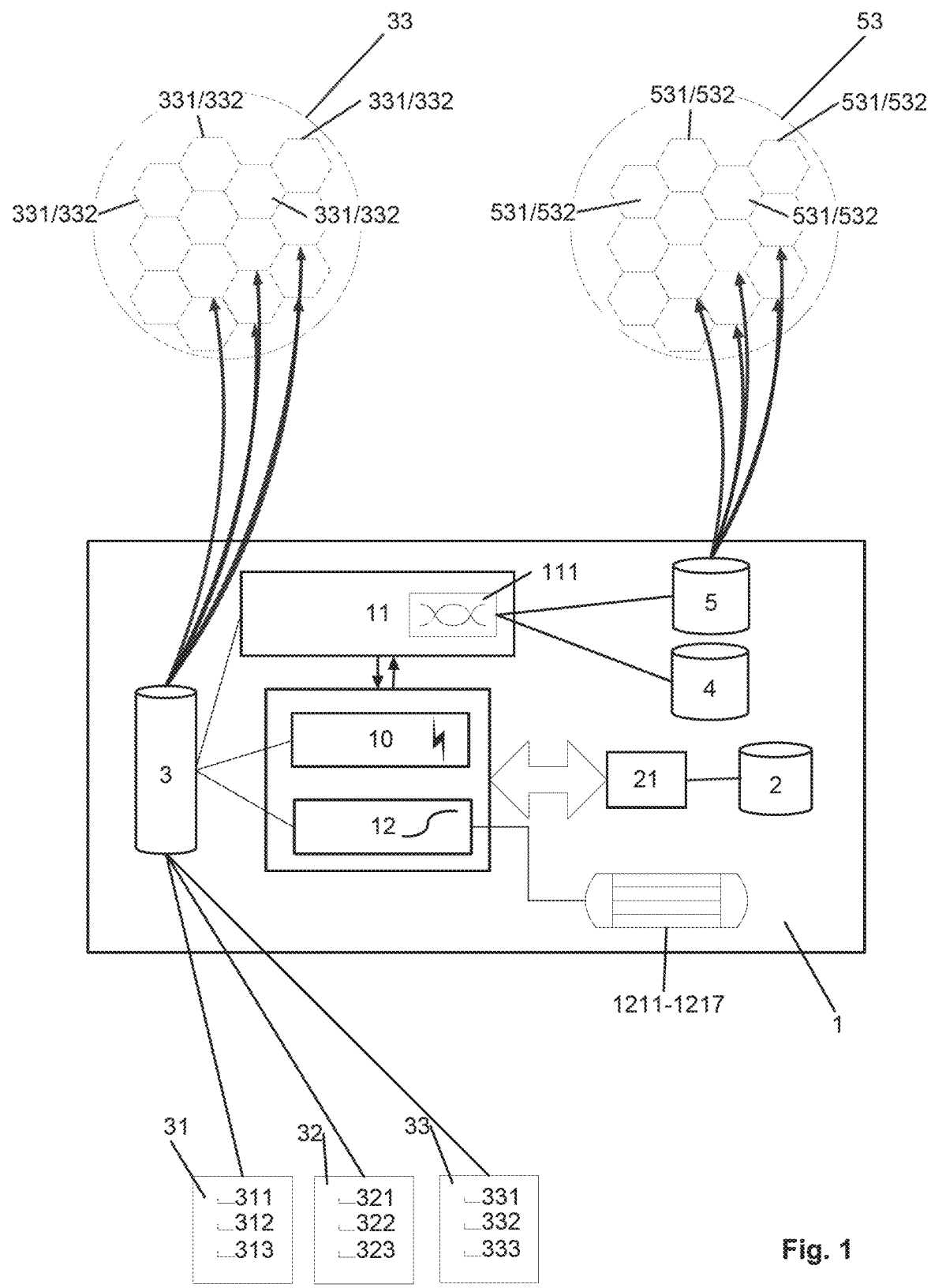
FIG. 1 shows a block diagram, schematically illustrating a fully automated, integrated learning labeling and classification system 1 with closed, self-sustaining pattern recognition 111, labeling and classification operation according to the present invention. Unclassified data sets 21 are selected and converted into a composition of graphic and text data forming compound data sets to be classified, wherein, by means of generated feature vectors 53 of training data sets 5, a machine learning classifier 12 is trained for improving the classification operation of the automated system 1 during training as a measure of the classification performance, if the automated labeling and classification system 1 is applied to unlabeled and unclassified data sets 2, and wherein unclassified data sets 2 are classified by applying the machine learning classifier 12 of the system 1 to the compound data set of the unclassified data sets 2.
Figure 2:
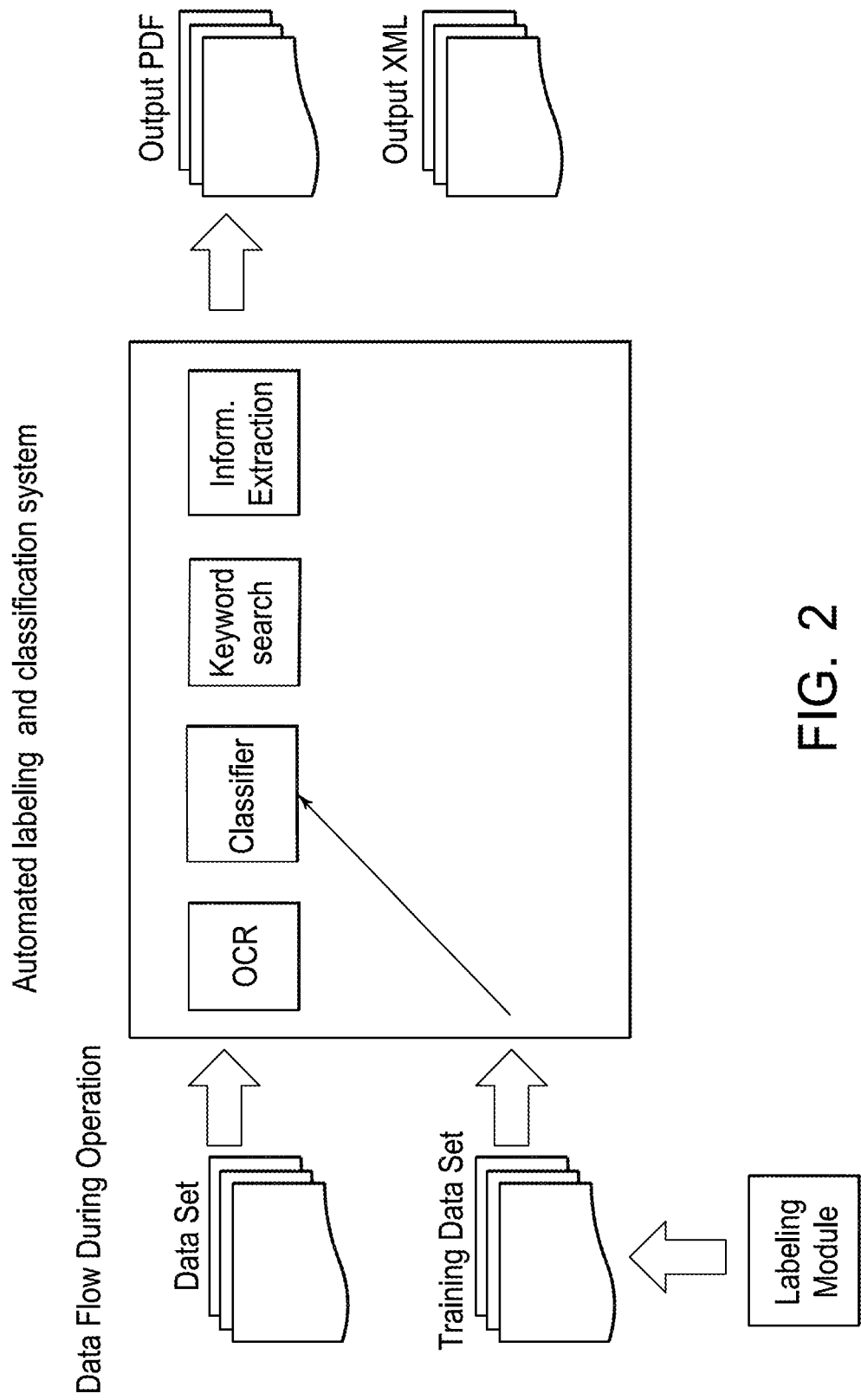
FIG. 2 shows a schematic depiction of an exemplary data flow during operation of the automated, integrated learning, labeling and classification system 1.
Figure 3:
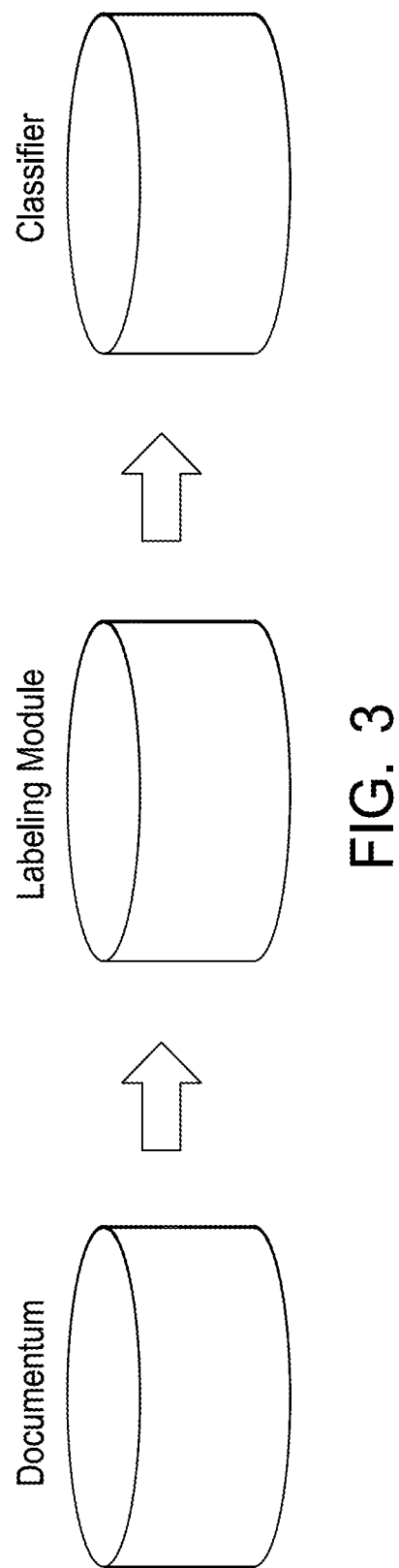
FIG. 3 shows a schematic depiction of an exemplary data flow during training operation of the automated, integrated learning and labeling and classification system 1. The unclassified data set, cases, or underwriting data flow from electronic document storage, such as Documentum, i.e. converter and pattern recognition module 11, to the labeling module 10 to the machine learning classifier 12. For the example of an underwriting action, it can be the task of the classifier, for example, to assign each page of a document (underwriting case) to a class, such as 'EKG', 'Lab Slip, etc.
Figure 4:
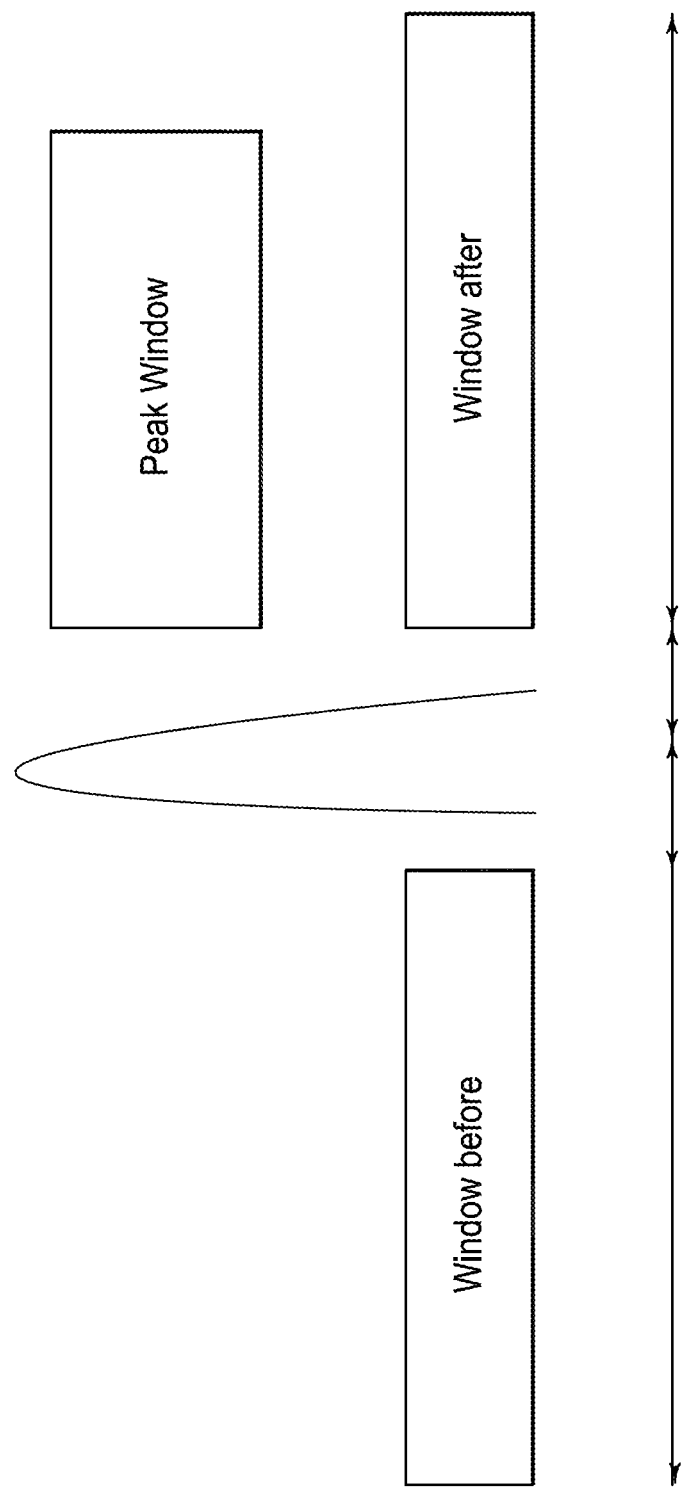
FIG. 4 shows a block diagram, schematically illustrating an exemplary implementation of a correcting action of the spikes feature of the machine learning classifier 12. Certain combinations of pages of a document to be classified are highly unlikely: for example, a single page of APS in an underwriting application is very unlikely. Another unlikely example is a single application page within the APS. Thus, the machine learning classifier 12 comprises a generic filter method that allows filtering out unlikely scenarios. This filter improves the overall performance of the automated system 1 by about 4-5%. It allows for defining the following: defining allowed labels, size and confidence values for all the 3 windows. In addition, it allows for defining as to whether the before and the after window must have the same label.

FIG. 1 schematically illustrates an architecture for a possible implementation of an embodiment of the fully automated, integrated learning and labeling and classification system 1 with closed, self-sustaining pattern recognition 111, labeling and classification operation. Unclassified data sets 21 are selected and converted into a composition of graphic and text data forming compound data sets to be classified. The selected unclassified data sets 2 can e.g. be converted into a composition of graphic and text data forming a compound data set to be classified, wherein the unclassified data sets 2 can be pre-processed by optical character recognition converting images of typed, handwritten or printed text into machine-encoded text. The selected unclassified data sets 2 can also be converted into a composition of graphic and text data forming a compound data set to be classified, wherein the graphic data are stored as raster graphics images in tagged image file format and the text data are stored in plain text format or rich text format. However, other file formats may be also used.

By means of generated feature vectors 53 of training data sets 5, a machine learning classifier 12 is trained for improving the classification operation of the automated system 1 by generic means during training as a measure of the classification performance, if the automated labeling and classification system 1 is applied to unlabeled and unclassified data sets 2. In general, each feature vector 33 can e.g. comprise a plurality of invariant features associated with a specific data set 3 or an area of interest of a data set 3. The invariant features of the graphic data 321 of the compound data set 33 of the specific data set 3 can e.g. comprise scale invariant, rotation invariant and position invariant features. Further, the area of interest can e.g. comprise a representation of at least a portion of a subject object within the image or graphic data 321 of the compound data set 32 of the specific data set 3, the representation comprising at least one of an object axis, an object base point, or an object tip point, and wherein the invariant features comprise at least one of a normalized object length, a normalized object width, a normalized distance from an object base point to a center of a portion of the image or graphic data, an object or portion radius, a number of detected distinguishable parts of the portion or the object, a number of detected features pointing in the same direction, a number of features pointing in the opposite direction of a specified feature, or a number of detected features perpendicular to a specified feature. As an example for an embodiment variant, perceptual hashing (pHash) methods can be applied to detect image similarities transforming the images into frequency areas, thereby achieving a representation that is more or less independent of rotation and scale. pHash produces a snippet or fingerprint of various forms of multimedia. Perceptual hash functions are analogous if the features are similar, for example in contrast to cryptographic hashing, which relies on the avalanche effect of a small change in input value creating a drastic change in output value. Perceptual hash functions provide the ability of having a correlation between hashes, thus allowing similar data to be found. For example, the present inventive system may comprise a database of text hashes of training data sets. Anytime a new data set 3, e.g. unclassified data set 2 or test data set 4 or a part of such a data set, demonstrates an appropriate similarity, the hashes will be almost exactly the same and can be appropriately flagged by the system. The same flagging process can be used for any multimedia, image or text file of training or test data sets.

The machine learning classifier 12 can e.g. comprise a scalable Naive Bayes classifier 1211 based on a linear number of parameters in the number of features and predictors, respectively. However, the machine learning classifier 12 can e.g. also comprise a non-probabilistic, binary, linear, support vector machines (SVM) classifier 1212 and/or a non-parametric k-Nearest Neighbors (k-NN) classifier 1213, and/or an exponential, probabilistic, max entropy classifier 1214, and/or decision tree classifier 1215 based on a finite set of values, and/or Balanced Winnow classifier 1216, and/or deep learning classifiers 1217 using multiple processing layers composed of multiple linear and non-linear transformations. However, it is to be noted that other known classifiers may also be used for the inventive system 1.

Finally, the machine learning classifier 12 can e.g. apply unigrams and bigrams and/or a combination of unigrams and bigrams or n-grams to the machine learning classifier 12. However, in a test environment, it was observed that n-grams do not significantly improve accuracy while reducing the operational speed of the system. Unclassified data sets 2 are classified by applying the machine learning classifier 12 of the system 1 to the compound data set of the unclassified data sets 2.

Training data sets 5 are generated and/or proposed and/or selected by filtering out appropriate data sets by means of the automated or semi-automated system 1. For each data set of selected test data sets 4, a feature vector 43 is generated by means of a labeling module 10 of the automated learning, labeling and classification system 1 comprising a plurality of labeled features 431/432 associated with the different selected test data sets 4. A two-dimensional confusion matrix 6 is generated based on the expected (manually checked) and actually predicted values generated by the classifier or based on the feature vector 43 of the test data sets 4 by means of the system 1. As an embodiment variant, said expected values may be checked and verified manually. The first dimension 61 comprises pre-processed, labeled features of the feature vectors 43 of the test data sets 4 and the second dimension 62 comprises classified and verified features of the feature vectors 43 of the test data sets 4 by applying the machine learning classifier 12 to the test data sets 4. In case that an inconsistently or wrongly classified test data set 4 and/or feature 431/432 of a test data set 4 is detected, the system proposes training samples to fill the gap in the system 1; for example, it generates and/or selects by filtering etc., additional training data sets 54 based on the confusion matrix 6, which are added to the training data sets 5, filling in the gaps in the training data sets 5 and improving the measurable performance of the system 1. Thus, the system proposes training samples to fill the gaps in the training data sets 5, if comparable training data sets 5 are triggered within the training data sets 5; and the system 1 creates a new labeling feature 103 of the recognizable feature vector 102, if no comparable training data sets 5 are triggered within the training data sets 5. One embodiment variant provides that if an inconsistently or wrongly classified test data set 4 and/or feature 431/432 of a test data set 4 is detected, the system 1 assigns the inconsistently or wrongly classified test data set 4 and/or feature 431/432 of the test data set 4 to the training data sets 5, if comparable training data sets 5 are triggered within the training data sets 5 based on the confusion matrix; and the system 1 creates a new labeling feature 103 of the recognizable feature vector 102, if no comparable training data sets 5 are triggered within the training data sets 5.

To allow a controllable learning performance, the machine learning classifier 12 comprises at least a population of separate rule sets 1231, where the generic learning operation 123 recombines and reproduces the best of these rule sets 1231, and/or the machine learning classifier 12 comprises a single set of rules in a defined population 1231, wherein the generic learning operation 123 selects the best classifiers 12 within that set. The system 1 can e.g. comprise a predefined threshold value 1221 for a performance strength-based and/or accuracy-based classification operation performance. Defining the threshold value appropriately, the performance quality of the learning operation can be set to a desired level. The machine learning classifier 12 can be realized as a genetic machine learning classifier 12.

To improve the operation of the system 1, distribution scaling can e.g. be applied to the data sets scaling word counts ensuring that pages with a small number of words are not underrepresented. Further, the probability of words that are quite unique for a certain class can e.g. be boosted as compared to other words that occur as well relatively frequently in other classes. In addition, pages of a data set 3 can e.g. be ignored by the system 1, if the page comprises only little or non-relevant text compared to average pages, and the label of the previous page is assigned during inference. Also, the data set 3 can e.g. be triggered for spikes in the data set 3, wherein data sets 3 with spikes are generically filtered out by means of the system 1 as representing unlikely scenarios. Finally, defined features 104 can e.g. be selectable to be ignored by the machine learning classifier 12, thus further improving the performance of the system 1.

It is to be mentioned that in FIGS. 1-4, 5A, and 5B, the circuits and associated blocks and arrows represent functions of the process according to the present invention, which may be implemented as electrical circuits and associated with wires or data busses transporting electrical signals. Alternatively, one or more associated arrows may represent communication (e.g., data flow) between software routines, particularly when the present method or apparatus of the present invention is embodied in a digital process. The present system 1 can e.g. be implemented by including a network, such as a local area network (LAN) of terminals or workstations, database file servers, input devices (such as keyboards and document scanners) and output devices configured by software (processor executable code), hardware, firmware, and/or combinations thereof, for accumulating, processing, administering and analyzing the potential for automated processing of insurance underwriting documents or risk-transfer claims in an automated workflow environment. The system provides for automated or semi-automated off-line and/or on-line identification, labeling and classification of underwriting or claim documents in risk-transfer environments, and further for the automated or semi-automated generation of training data sets. No prior art system is able to provide such an automated, autonomous and self-contained system. It is important to note, that the present inventive system is not limited to uses and applications as discussed in this paragraph but can be applied, without any changes or only minor modifications, to other fields as well.

The invention may be implemented as an automated system of computer units, communicatively coupled to one another via various types of networks, such as wide area networks and global interconnections of computers and computer networks commonly referred to as the worldwide web or internet. Such a network may typically include one or more microprocessor-based computing devices, such as computer (PC) workstations, as well as servers. "Computer", as referred to above, generally denotes general-purpose data processing systems or computing devices that include processor-driven operations. "Processor" generally denotes a processing or computing device, including a Central Processing Unit (CPU), such as a microprocessor. A CPU generally includes an arithmetic logic unit (ALU), which performs arithmetic and logical operations, and a control unit, which extracts instructions (e.g., software, programs or code) from memory and decodes and executes them, calling on the ALU, when necessary. "Memory" denotes one or more devices capable of storing data, such as in the form of chips, tapes, disks or drives. Memory may take the form of one or more media drives, random access memory (RAM), read-only memory (ROM), programmable read-only memory (PROM), erasable programmable read-only memory (EPROM), or electrically erasable programmable read-only memory EEPROM) chips; these are further non-limiting examples only. Memory may be internal or external to an integrated unit, including a processor. Memory may be internal or external to an integrated unit, including a computer. Finally, "Server", as used herein, generally denotes a computer or device that is communicatively coupled to a network and that manages network resources. For example, a file server is a computer and storage device that is dedicated to storing files, while a database server is a computer system that processes database queries. A server may refer to a discrete computing device, or it may refer to the program that is managing resources rather than an entire computer. Referring to FIG. 1, the system 1 can be implemented to include one or more terminals. Each terminal has a processor, such as CPU, a display and a memory. The terminals include code that is operable by the CPU for inputting an underwriting or claim case and data set, respectively, whether the latter may be a financial, legal, fraud or insurance claim and for recognizing favorable claim files. Terminals also include code that is operable to create patterns of concepts and terms from the files and to manage the files. A server is interconnected to the terminals for storing data pertinent to an underwriting or claim document. User input device(s) for receiving input into each terminal can also be provided. An output device, such as a printer or electronic document formatter, such as a portable document format generator, for producing documents, such as hard copy and/or soft copy lists of collection potential relative to underwritings or claims, including at least one of text and graphics, being interconnected and responsive to each of the terminals, is also provided. In one embodiment, the output device represents one or more output devices, such as printers, facsimile machines, photocopiers, etc., as, for example, used to generate hard copies of an underwriting or claim document, irrespective of whether this is a financial, legal, fraud or risk-transfer document. Communications channels that may be of the wired and/or wireless type, provide interconnectivity between terminals, server and one or more networks, that may, in turn, be communicatively coupled to the internet, a wide area network, a metropolitan area network, a local area network, a terrestrial broadcast system, a cable network, a satellite network, a wireless network, or a telephone network, as well as portions or combinations of these and other types of networks (together herein referred to variously as a network or the internet). Finally, security measures may be used in connection with network transmissions of information to protect the same from being accessed without authorization. Such secure networks and methods are well known to those skilled in the art of computer and network programming.

The invention claimed is:

1. An automated, integrated learning and labeling and classification learning system with closed, self-sustaining pattern recognition, labeling and classification operation, comprising:

circuitry configured to implement a machine learning classifier, the machine learning classifier comprising a non-probabilistic, binary, linear, support vector machines classifier and/or a non-parametric k-Nearest Neighbors classifier, and/or an exponential, probabilistic, max entropy classifier, and/or decision tree classifier based on a finite set of values, and/or Balanced Winnow classifier, and/or deep learning classifiers using multiple processing layers composed of multiple linear and non-linear transformations;

select unclassified data sets and convert the unclassified data sets into an assembly of graphic and text data forming compound data sets to be classified, wherein, by generated feature vectors of training data sets, the machine learning classifier is trained for improving the classification operation of the automated system during training with respect to a measure of the classification performance, in case of applying the automated system to unlabeled and unclassified data sets, and wherein unclassified data sets are classified by applying the machine learning classifier of the automated system to the compound data set of the unclassified data sets, the machine learning classifier comprising at least a population of separate rule sets, such that a learning operation recombines and reproduces a best of the rule sets, or the machine learning classifier comprising a single set of rules in a defined population, such that the learning operation selects best classifiers within the single set of rules;

generate training data sets, wherein for each data set of selected test data sets, a feature vector is generated comprising a plurality of labeled features associated with the different selected test data sets;

generate a two-dimensional confusion matrix based on the feature vector of the test data sets, wherein a first dimension of the two-dimensional confusion matrix comprises pre-processed labeled features of the feature vectors of the test data sets and a second dimension of the two-dimensional confusion matrix comprises classified and verified features of the feature vectors of the test data sets by applying the machine learning classifier to the test data sets;

in case an inconsistently or wrongly classified test data set and/or feature of a test data set is detected, assign the inconsistently or wrongly classified test data set and/or feature of the test data set to the training data sets, and generate additional training data sets based on the confusion matrix, which are added to the training data sets for filling in gaps in the training data sets and improving the measurable performance of the automated system, wherein additional training data sets are generated to fill the gaps in the training data sets in response to comparable training data sets being triggered within the training data sets, and wherein a new labeling feature of a recognizable feature vector is created in response to no comparable training data sets being triggered within the training data sets; and trigger data sets triggered for spikes in the data sets, wherein data sets with spikes are filtered out representing unlikely data sets by providing a correcting action of spike features for the machine learning classifier by filtering out the unlikely data sets to improve overall performance of the automated system by selecting the spike features to be ignored by the machine learning classifier.

2. The automated learning, labeling and classification system according to claim 1, wherein the circuitry is configured such that the machine learning classifier comprises at least a scalable Naive Bayes classifier based on a linear number of parameters in the number of features and predictors, respectively.

3. The automated learning, labeling and classification system according to claim 1, wherein the circuitry is configured such that the machine learning classifier comprises a non-probabilistic, binary, linear, support vector machines classifier and a non-parametric k-Nearest Neighbors classifier, and an exponential, probabilistic, max entropy classifier, and decision tree classifier based on a finite set of values, and Balanced Winnow classifier, and deep learning classifiers using multiple processing layers composed of multiple linear and non-linear transformations.

4. The automated learning, labeling and classification system according to claim 1, wherein the circuitry is configured such that the machine learning classifier applies unigrams and bigrams, and/or a combination of unigrams and bigrams or n-grams to the machine learning classifier.

5. The automated learning, labeling and classification system according to claim 1, wherein the circuitry is configured to apply distribution scaling to the data sets scaling word counts so that pages with a small number of words are not underrepresented.

6. The automated learning, labeling and classification system according to claim 1, wherein the circuitry is configured to boost a probability of words that are unique for a certain class as compared to other words that occur relatively frequently in other classes.

7. The automated learning and labeling and classification system according to claim 1, wherein the circuitry is configured to ignore a given page of a data set if the given page comprises only little or non-relevant text compared to average pages, and the label of the previous page is assigned during inference.

8. The automated learning, labeling and classification system according to claim 1, wherein the circuitry is configured to accept a selection of defined features to be ignored by the machine learning classifier.

9. The automated learning, labeling and classification system according to claim 1, wherein the circuitry is configured to have a predefined threshold value for a performance strength-based and/or accuracy-based classification of the operation performance.

10. The automated learning, labeling and classification system according to claim 1, wherein the circuitry is configured to convert the selected unclassified data sets to an assembly of graphic and text data forming a compound data set to be classified, and to pre-process the unclassified data sets by optical character recognition converting images of typed, handwritten or printed text into machine-encoded text.

11. The automated learning, labeling and classification system according to claim 1, wherein the circuitry is configured to convert the selected unclassified data sets to an assembly of graphic and text data forming a compound data set to be classified, to pre-process and store the graphic data as raster graphics images in tagged image file format, and to store the text data in plain text format or rich text format.

12. The automated learning, labeling and classification system according to claim 1, wherein the circuitry is configured such that each feature vector comprises a plurality of invariant features associated with a specific data set or an area of interest of a data set.

13. The automated learning, labeling and classification system according to claim 12, wherein the circuitry is configured such that the invariant features of the graphic data of the compound data set of the specific data set comprise scale invariant, rotation invariant, and position invariant features.

14. The automated learning, labeling and classification system according to claim 12, wherein the circuitry is configured such that the area of interest comprises a representation of at least a portion of a subject object within the image or graphic data of the compound data set of the specific data set, the representation comprising at least one of an object axis, an object base point, or an object tip point, and wherein the invariant features comprise at least one of a normalized object length, a normalized object width, a normalized distance from an object base point to a center of a portion of the image or graphic data, an object or portion radius, a number of detected distinguishable parts of the portion or the object, a number of detected features pointing in the same direction, a number of features pointing in the opposite direction of a specified feature, or a number of detected features perpendicular to a specified feature.

15. The automated learning, labeling and classification system according to claim 1, wherein the circuitry is configured such that the pre-processed labeled features of the feature vectors of the test data sets comprise manually labeled pre-processed features of the feature vectors of the test data sets as a verified gold standard.

16. The automated learning, labeling and classification system according to claim 1, wherein the spike features selected to be ignored by the machine learning classifier correspond to non-relevant textual information that is not relevant compared to other textual information.

17. An automated, integrated learning, labeling and classification learning method for an automated system with closed, self-sustaining pattern recognition, labeling and classification operation, comprising:

implementing a machine learning classifier, the machine learning classifier comprising a non-probabilistic, binary, linear, support vector machines classifier and/or a non-parametric k-Nearest Neighbors classifier, and/or an exponential, probabilistic, max entropy classifier, and/or decision tree classifier based on a finite set of values, and/or Balanced Winnow classifier, and/or deep learning classifiers using multiple processing layers composed of multiple linear and non-linear transformations;

selecting unclassified data sets and convert the unclassified data sets into an assembly of graphic and text data forming a compound data set to be classified, wherein, by feature vectors of training data sets, the machine learning classifier is trained for improving the classification operation of the automated system during training with respect to a measure of the classification performance in case of applying the automated system to unclassified data sets, and classifying unclassified data sets by applying the machine learning classifier of the automated system to the compound data set, the machine learning classifier comprising at least a population of separate rule sets, such that a learning operation recombines and reproduces a best of the rule sets, or the machine learning classifier comprising a single set of rules in a defined population, such that the learning operation selects best classifiers within the single set of rules;

generating training data sets, wherein for each data set of selected test data sets, a feature vector is generated comprising a plurality of labeled features associated with the different selected test data sets;

generating a two-dimensional confusion matrix based on the feature vector of the test data sets, wherein a first dimension of the two-dimensional confusion matrix comprises pre-processed labeled features of the feature vectors of the test data sets, and a second dimension of the two-dimensional confusion matrix comprises classified and verified features of the feature vectors of the test data sets by applying the machine learning classifier to the test data sets;

in case that an inconsistently or wrongly classified test data set and/or feature of a test data set is detected, assigning the inconsistently or wrongly classified test data set and/or feature of the test data set to the training data sets, and generating additional training data sets, based on the confusion matrix by the automated system, which are added to the training data sets, thereby filling in gaps in the training data sets and improving the measurable performance of the automated system, wherein additional training data sets are generated to fill the gaps in the training data sets in response to comparable training data sets being triggered within the training data sets, and wherein a new labeling feature of a recognizable feature vector is created in response to no comparable training data sets being triggered within the training data sets; and triggering data sets triggered for spikes in the data sets, wherein data sets with spikes are filtered out representing unlikely data sets by providing a correcting action of spike features for the machine learning classifier by filtering out the unlikely data sets to improve overall performance of the automated system by selecting the spike features to be ignored by the machine learning classifier.

18. The automated, integrated learning, labeling and classification method for closed, self-sustaining pattern recognition, labeling and classification operation according to claim 17, further comprising extending the confusion matrix and/or the recognizable feature vector correspondingly by the triggered new labeling feature if no comparable training data sets are triggered within the training data sets.

* * * * *